(12) United States Patent
Hara et al.

(10) Patent No.: US 7,319,792 B2
(45) Date of Patent: Jan. 15, 2008

(54) IMAGE PROCESSING DEVICE

(75) Inventors: Junichi Hara, Kanagawa (JP); Taku Kodama, Kanagawa (JP); Shousaku Tokuda, Tottori (JP)

(73) Assignee: Ricoh Company, Ltd., Tokyo (JP)

( * ) Notice: Subject to any disclaimer, the term of this patent is extended or adjusted under 35 U.S.C. 154(b) by 939 days.

(21) Appl. No.: 10/665,477

(22) Filed: Sep. 22, 2003

(65) Prior Publication Data

US 2004/0136597 A1 Jul. 15, 2004

(30) Foreign Application Priority Data

Sep. 19, 2002 (JP) ............................. 2002-273984

(51) Int. Cl.
*G06K 9/36* (2006.01)
*G06K 9/46* (2006.01)

(52) U.S. Cl. .................. 382/232; 382/235; 382/240

(58) Field of Classification Search ................ 382/232, 382/235, 240, 244, 247, 248
See application file for complete search history.

(56) References Cited

U.S. PATENT DOCUMENTS

| | | | |
|---|---|---|---|
| 5,923,787 A | 7/1999 | Hara et al. | |
| 6,314,452 B1 * | 11/2001 | Dekel et al. | ................ 709/203 |
| 6,898,323 B2 * | 5/2005 | Schwartz et al. | ........... 382/240 |
| 7,110,608 B2 * | 9/2006 | Chan et al. | ................. 382/239 |

FOREIGN PATENT DOCUMENTS

| | | |
|---|---|---|
| JP | 1-130668 | 5/1989 |
| JP | 6-46243 | 2/1994 |
| JP | 6-205197 | 7/1994 |
| JP | 7-170390 | 7/1995 |
| JP | 11-285006 | 10/1999 |
| JP | 2000-358148 | 12/2000 |
| JP | 2001-136394 | 5/2001 |
| JP | 2001-204030 | 7/2001 |
| JP | 2001-218062 | 8/2001 |

* cited by examiner

*Primary Examiner*—Phuoc Tran
(74) *Attorney, Agent, or Firm*—Oblon, Spivak, McClelland, Maier & Neustadt, P.C.

(57) ABSTRACT

An image processing device is provided to increase processing speed with a simple configuration and without increasing required memory capacity when editing a compressed image. The image processing device includes an image dividing unit, an encoding unit, and an editing unit. The image dividing unit divides an input image into image sections. The encoding unit encodes individual image sections independently, and generates a code stream; the code stream includes code sections corresponding to the image sections. The editing unit edits an individual code section, for example, deletes or extracts an image section, or replaces an image section with another image, and outputs the resulting code stream.

8 Claims, 12 Drawing Sheets

| T00 | T01 | T02 | T03 |
|-----|-----|-----|-----|
| T04 | T05 | T06 | T07 |
| T08 | T09 | T10 | T11 |
| T12 | T13 | T14 | T15 |

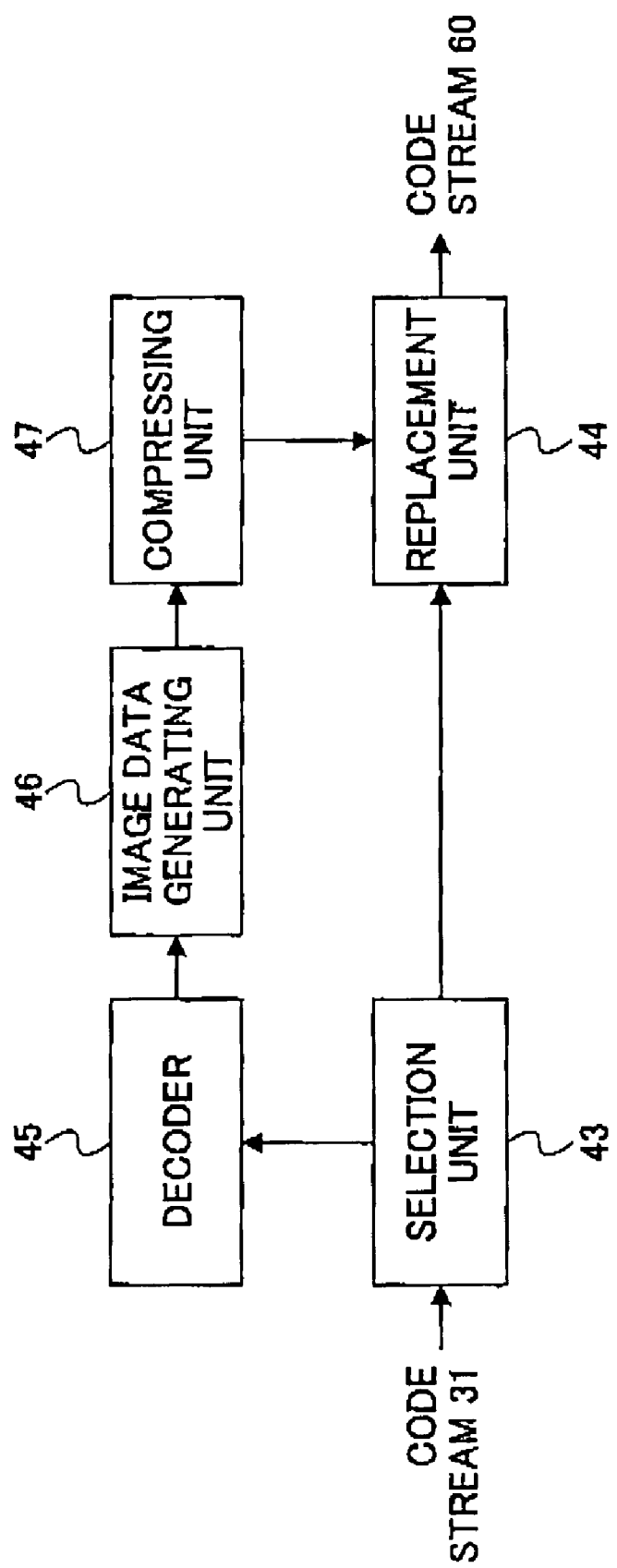

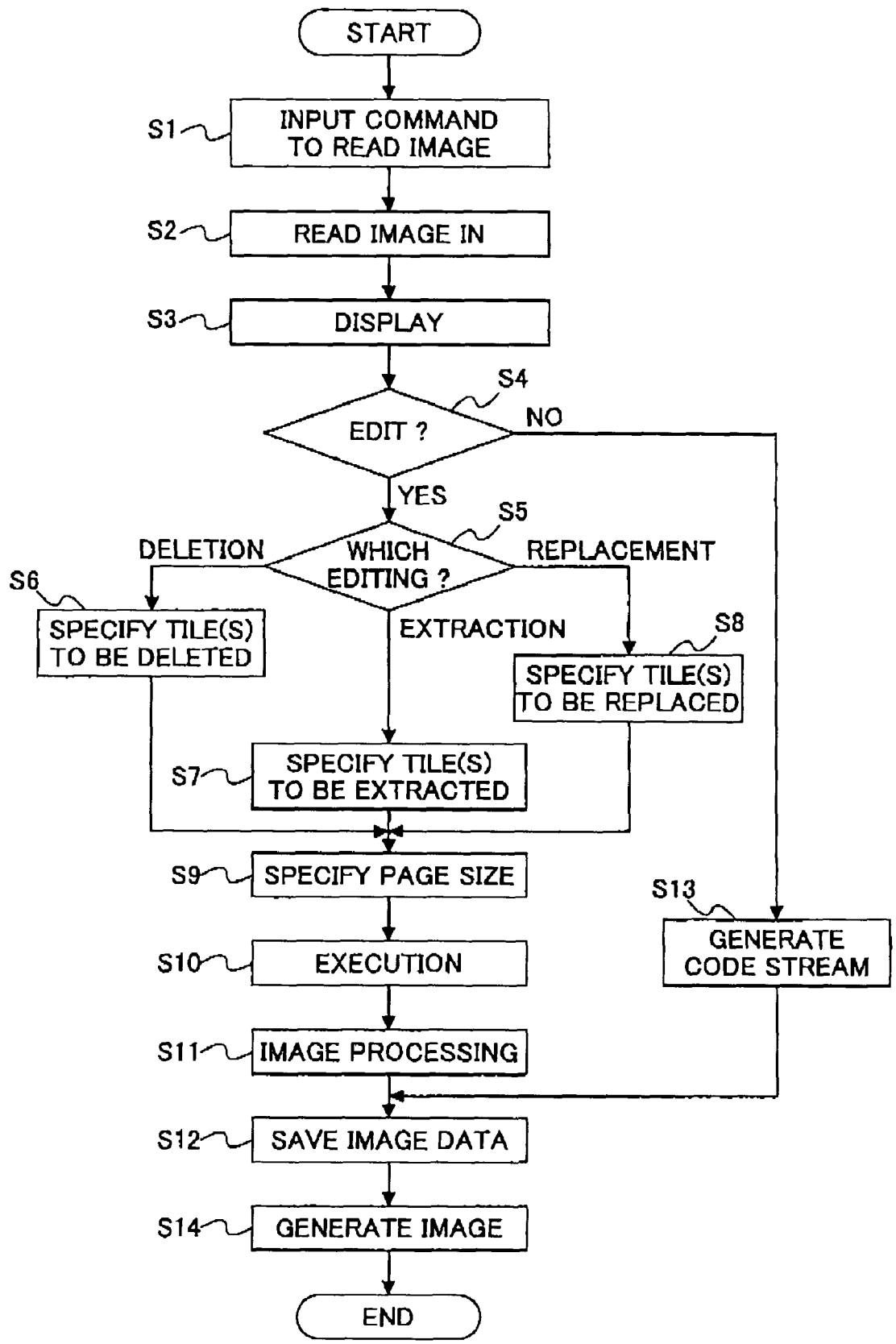

IMAGE PROCESSING DEVICE

BACKGROUND OF THE INVENTION

1. Field of the Invention

The present invention relates to an image processing device, an image forming apparatus, a program, and a storage medium.

2. Description of the Related Art

In the conventional technique of editing images compressed by the JPEG algorithm, in order to edit a compressed image, the whole compressed image has to be decoded first to obtain the original uncompressed image, and then the uncompressed image is edited. This technique requires a relatively large memory capacity, and is difficult to achieve high speed image processing.

To solve the problem, techniques have been proposed to index sections of an image compressed by the JPEG algorithm. For example, Japanese Laid Open Patent Application No. 6-46243 and Japanese Laid Open Patent Application No. 7-170390 disclose such techniques.

However, techniques disclosed in Japanese Laid Open Patent Application No. 6-46243 and Japanese Laid open Patent Application No. 7-170390 require special devices for dealing with data generated by DPCM (differential Pulse Coding Modulation) in JPEG. This results in a complicated configuration of the system, and high manufacturing cost.

SUMMARY OF THE INVENTION

Accordingly, it is a general object of the present invention to solve one or more problems of the related art.

A specific object of the present invention is to provide an image processing device capable of increasing processing speed with a simple configuration and without increasing required memory capacity when editing a compressed image.

According to a first aspect of the present invention, there is provided an image processing device, comprising: an image dividing unit configured to divide an input image into a plurality of image sections; an encoding unit configured to independently encode each of the image sections, and generate a first code stream including a plurality of code sections corresponding to the image sections; and an editing unit configured to edit one of the code sections in the first code stream, and generate a second code stream based on the edited code section.

According to the present invention, because the input image is divided into independent image sections, and these image sections are encoded independently, it is possible to independently edit any code section corresponding to an image section without decoding the code section or the whole code stream, and it is not necessary to use any special devices. As a result, it is possible to increase processing speed with a simple configuration and without increasing memory capacity.

The editing unit may include a deletion unit configured to delete at least one of the code sections from the first code stream and output the second code stream including the remaining code sections in the first code stream. Further, the deletion unit may allocate information data indicating that the deleted code section is out of the input image to a header of the deleted code section, and output the second code stream including the remaining code sections in the first code stream and the deleted code section.

In addition, the editing unit may include an extraction unit configured to extract at least one of the code sections from the first code stream and output the second code stream including the extracted at least one code section. Further, the extraction unit may allocate information data indicating that each of the unextracted code sections is out of the input image to a header of each of the unextracted code sections, and output the second code stream including the extracted code section and the unextracted code sections.

In addition, the editing unit may include a selection unit configured to select at least one of the code sections from the first code stream, and a replacement unit configured to replace the selected code section with predetermined coded data and output the second code stream including the unselected code sections in the first code stream and the predetermined coded data. Further, the predetermined coded data may include a plurality of pixels each having a predetermined pixel value.

According to the present invention, it is possible to perform editing such as deletion, extraction, and replacement of individual image sections and output various kinds of code streams.

The editing unit may further include a decoding unit configured to decode the selected code section and generate first image data corresponding to the selected code section; an image data generation unit configured to generate second image data based on the first image data; and a compression unit configured to encode the second image data and generate coded data, and output the coded data to the replacement unit as the predetermined coded data.

The editing unit may further include a detection unit configured to determine a texture pixel value of the first image data output from the decoding unit; and the image data generation unit assigns the determined texture pixel value to pixels of the first image data and outputs the assigned first image data as the second image data.

According to the present invention, it is possible to modify a part of the input image by extracting, decoding and editing an individual image section, generating a new image section and inputting the new image section to the input image. For example, the pixels of the extracted image section may be modified to have other values, such as the value of the texture portion of the input image. In doing this, it is possible to naturally delete an image section or to extract an image section without leaving a hole in the input image.

The replacement unit may replace image data of the selected code section with image data of the predetermined coded data and maintains a header of the selected code section unchanged. Alternatively, the replacement unit may replace a header and image data of the selected code section with a header and image data of the predetermined coded data, respectively. Further, when replacing the selected code section with the predetermined coded data, the replacement unit replaces a data length of the selected code section or a data length of image data of the selected code section with a data length of the predetermined coded data or a data length of image data of the predetermined coded data.

As an embodiment of the present invention, the encoding unit may encode each of the image sections by using one of entropy coding with two-dimensional discrete wavelet transformation and arithmetic coding. Further, the encoding unit may encode each of the image sections by using the JPEG 2000 algorithm; and each of the image sections corresponds to a tile in the JPEG 2000 algorithm. In this case, the height and the width of the tile are multiples of a quantity $d=2^L$, where L is the wavelet decomposition level.

According to the present invention, it is possible to edit each individual tile without being affected by wavelet division.

According to a second aspect of the present invention, there is provided an image forming apparatus including an image reading unit configured to read an image on a manuscript; an image processing device, comprising an image dividing unit configured to divide an input image into a plurality of image sections; an encoding unit configured to independently encode each of the image sections, and generate a first code stream including a plurality of code sections corresponding to the image sections; and an editing unit configured to edit one of the code sections in the first code stream, and generate a second code stream based on the edited code section; and a printer engine configured to form an image on a sheet of paper based on the second code stream.

According to a third aspect of the present invention, there is provided a program executed by a computer for processing an input image, comprising the steps of: dividing the input image into a plurality of image sections; independently encoding each of the image sections, and generating a first code stream including a plurality of code sections corresponding to the image sections; and editing one of the code sections in the first code stream, and generating a second code stream based on the edited code section.

According to a fourth aspect of the present invention, there is provided a storage medium that stores a program executed by a computer for processing an input image, the program comprising the steps of: dividing the input image into a plurality of image sections; independently encoding each of the image sections, and generating a first code stream including a plurality of code sections corresponding to the image sections; and editing one of the code sections in the first code stream, and generating a second code stream based on the edited code section.

These and other objects, features, and advantages of the present invention will become more apparent from the following detailed description of preferred embodiments given with reference to the accompanying drawings.

BRIEF DESCRIPTION OF THE DRAWINGS

FIG. 11 is a block diagram showing another configuration for executing the operation of replacing tiles in a code stream;

FIG. 16 is a flow chart showing the operation of the digital copy machine 51 when editing a code stream of an image.

DESCRIPTION OF THE PREFERRED EMBODIMENTS

Below, preferred embodiments of the present invention are explained with reference to the accompanying drawings.

First Embodiment

Figure 1:
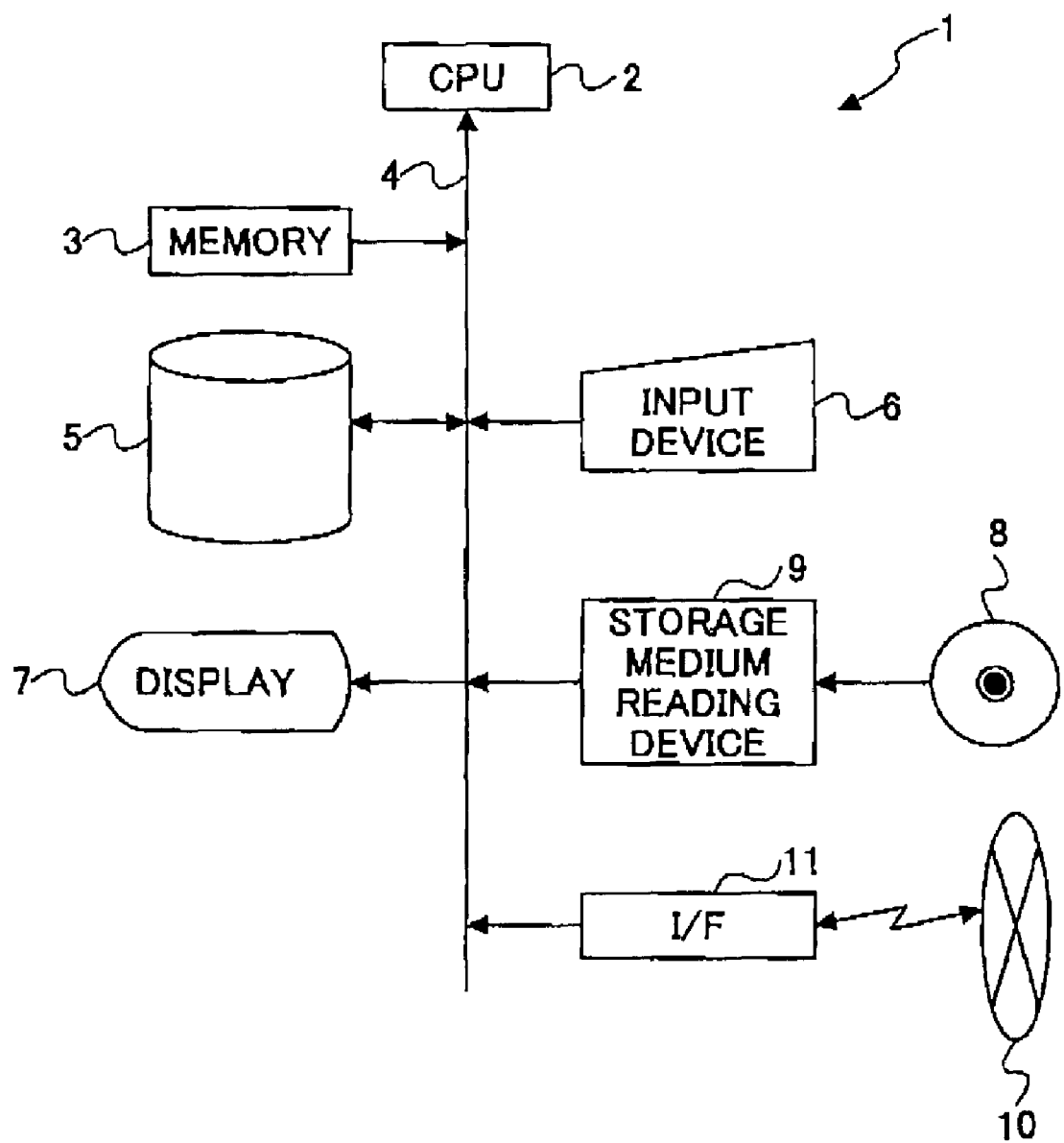
FIG. 1 is a block diagram of an image processing device according to a first embodiment of the present invention.

FIG. 1 is a block diagram of an image processing device according to a first embodiment of the present invention.

The image processing device 1 illustrated in FIG. 1, for example, is a computer that includes a CPU 2 that performs various calculations and controls parts of the image processing device 1; a memory 3 including, for example, ROM (Read only Memory) and RAM (Randomly Access Memory); a storage device 5 such as a hard disk; an input device 6 such as a mouse and a keyboard; a display 7 such as an LCD (Liquid Crystal Display) and a CRT (Cathode Ray Tube); a storage medium 8 such as an optical disk; a storage medium reading device 9 for reading the storage medium 8; and a communication interface (I/F) 11.

A bus 4 is provided to connect the CPU 2, memory 3, storage device 5, input device 6, display 7, the storage medium reading device 9, and I/F 11. The image processing device 1 is connected to a network 10, for example, the Internet, through I/F 11.

In addition to an optical disk 8, such as a CD and a DVD, the storage medium 8 may also be any of a Magneto-optic disk (MO), a flexible disk, or any other recording medium. According to the specific type of the storage medium 8, the storage medium reading device 9 may be an optical disk drive, an MO drive, a flexible disk drive, and so on.

An image processing program for realizing the functions provided by the present invention is stored in the storage device 5. This image processing program may be read from the storage medium 8 by using the storage medium reading device 9, and installed in the storage device 5, or may be downloaded through the network 10 and installed in the storage device 5. After installing this image processing program in the storage device 5, the image processing device 1 becomes operable. This image processing program may be an independent application program, or a part of an application package; it can be made specific to a certain OS or be independent of the OS.

Figures 2, 3:
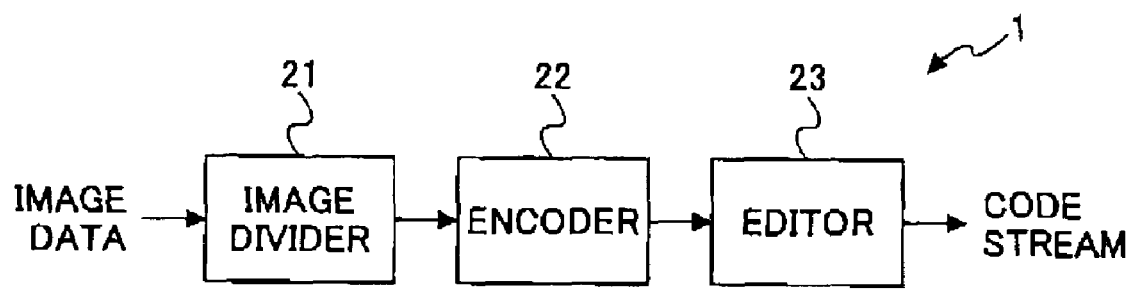
FIG. 2 is a functional block diagram of the image processing device 1.
FIG. 3 is a diagram illustrating an example of dividing an image into tiles.

FIG. 2 is a functional block diagram of the image processing device 1.

As shown in FIG. 2, functionally, the image processing device 1 includes an image divider 21, an encoder 22, and an editor 23.

The image divider 21 divides an image into a number of small image sections, in other words, the image divider 21 divides image data into a series of small image data sections, and outputs the data section series to the encoder 22.

The encoder 22 encodes each of the small image sections independently, thereby compressing the input image data and generating a code stream. In this coding processing, for example, the JPEG 2000 algorithm is used, and entropy coding with two-dimensional discrete wavelet transformation or arithmetic coding is used for encoding the input image data. Hence, the above "small image section", the unit division of the input image data, is equivalent to the so-called "tile" in JPEG 2000.

The editor 23 edits each tile in the code stream generated in the encoder 22, and generates a new code stream.

The functions of the image divider 21, the encoder 22, and the editor 23 are realized by an image processing program executed by the CPU 2.

When using the JPEG 2000 algorithm, assuming L represents the level of wavelet division, and $d=2^L$, if the width and height of the tile are multiples of d, the size of the tile is not influenced by the wavelet division, and hence it is possible to edit each tile independently.

Below, processing by the editor 23 is described in detail.

FIG. 3 is a diagram illustrating an example of dividing an image into tiles. As shown in FIG. 3, the image divider 21 divides an input image into 16 tiles (T00 through T15). The encoder 22 encodes the 16 tiles separately, and the editor 23 edits the thus generated code streams.

Figure 4:
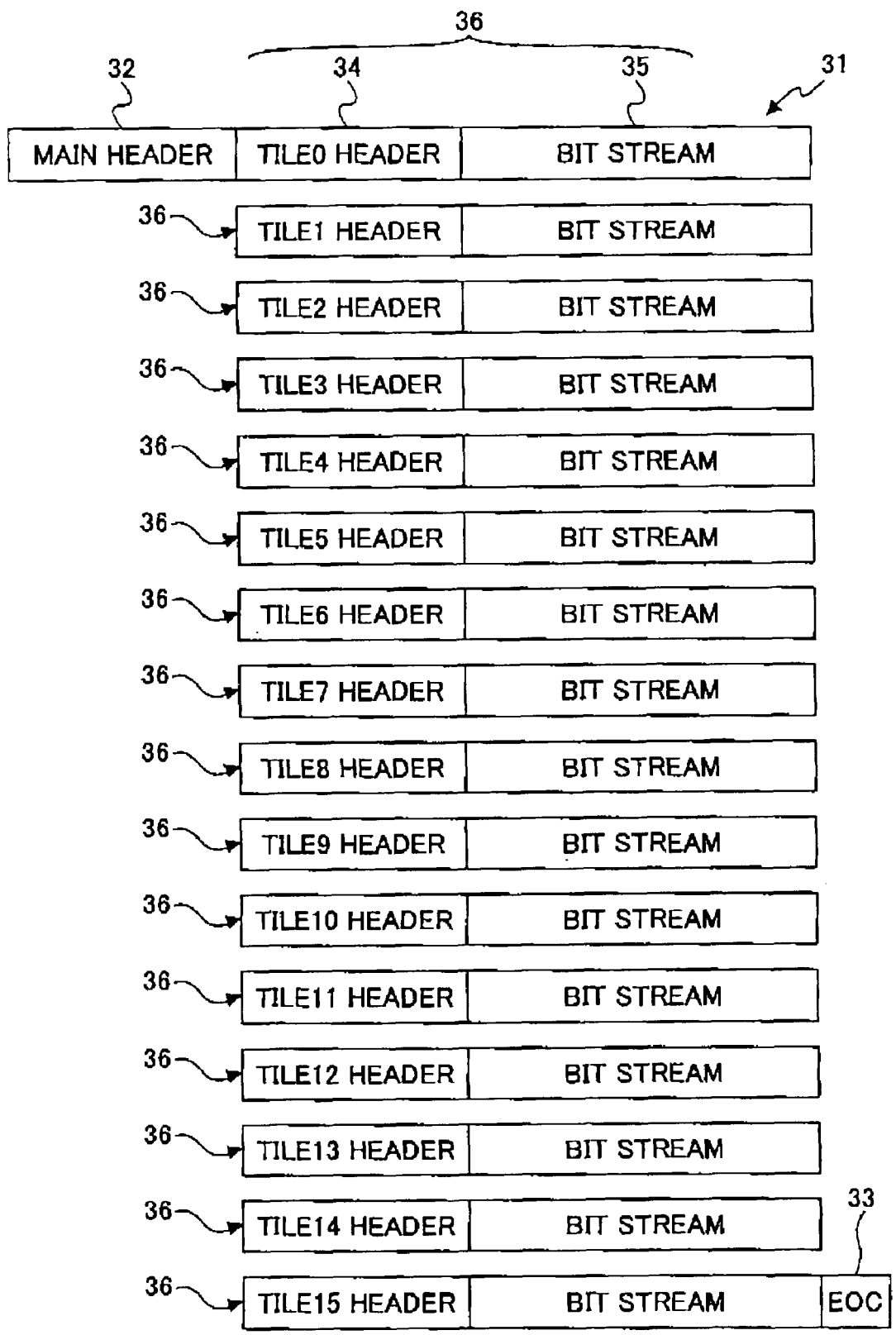
FIG. 4 is a data diagram illustrating an example of the structure of a code stream 31 generated by encoding the tiles shown in FIG. 3.

FIG. 4 is a diagram illustrating an example of the structure of a code stream 31 generated by encoding the tiles shown in FIG. 3. As illustrated in FIG. 4, the code stream 31 has a main header 32 at the beginning, an EOC (End Of Code stream) 33 at the end, and 16 tiles 36 allocated and between the main header 32 and the EOC 33. Each of the tiles 36 is formed from a tile header 34 and a bit stream 35, and these tiles 36 are arranged in order of the tile number.

[Deletion of Tiles]

Figure 5:
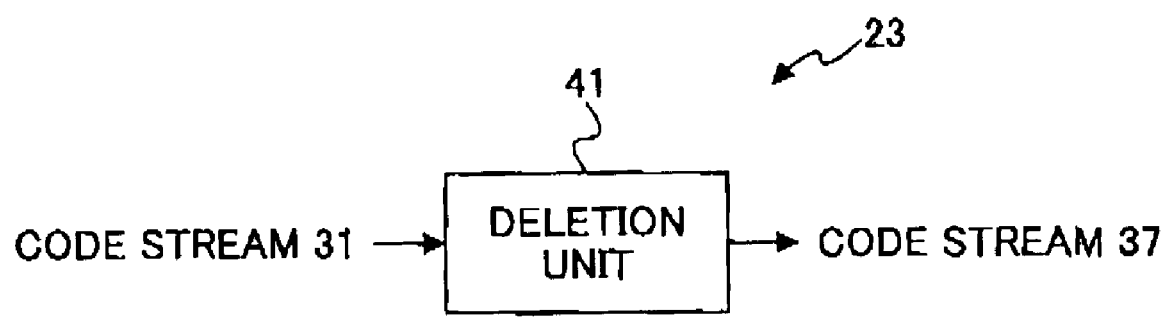
FIG. 5 is a schematic diagram showing operation of deleting tiles from a code stream.

FIG. 5 is a diagram showing an operation of deleting tiles from a code stream. As shown in FIG. 5, the editor 23 has a deletion unit 41. The deletion unit 41 deletes one or more tiles 36 from the code stream 31, and the remaining coded data form a new code stream 37.

Figure 6:
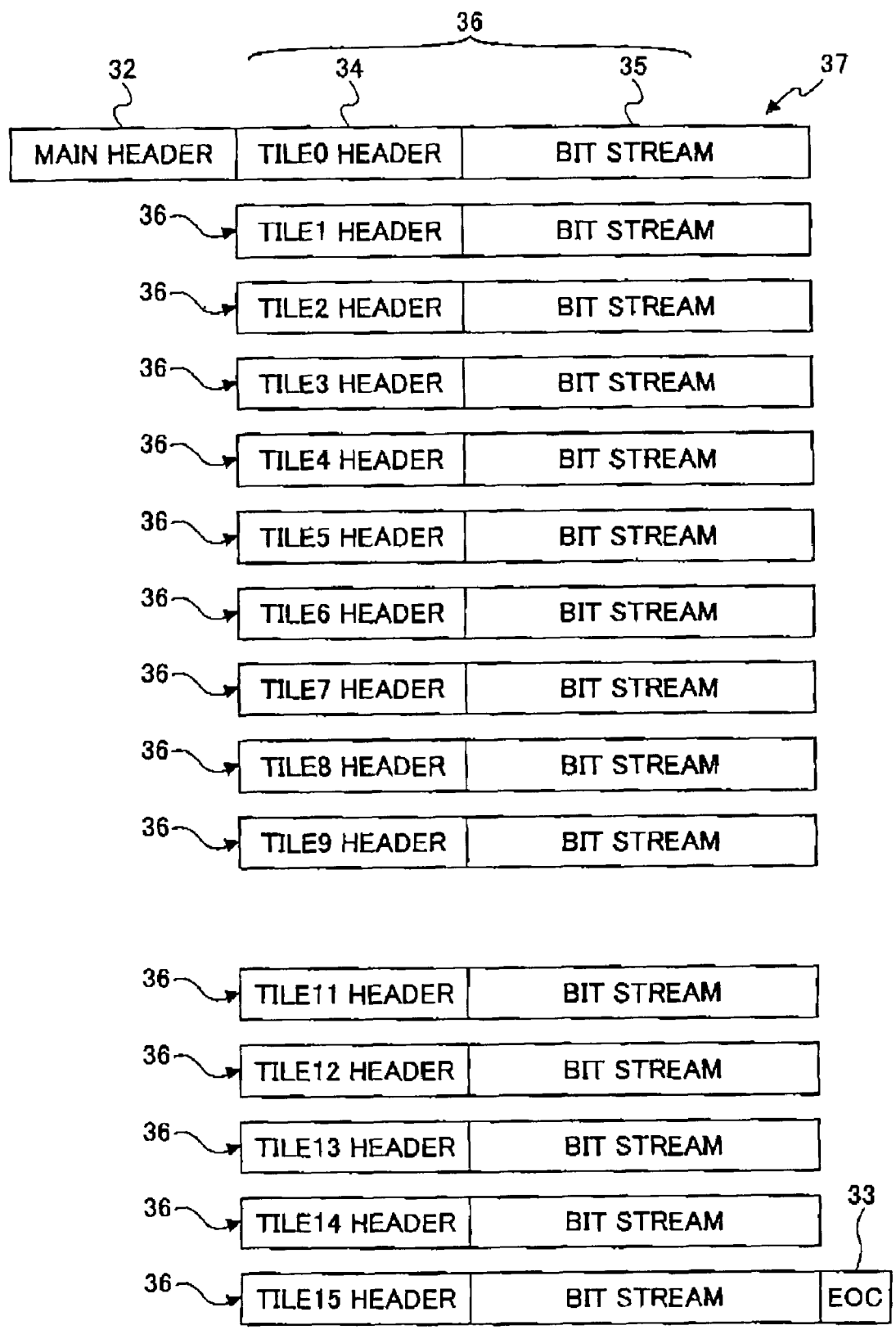
FIG. 6 is a data diagram illustrating the code stream 37 after deletion of tiles from the code stream 31.

FIG. 6 is a diagram illustrating the code stream 37 after deletion of tiles from the code stream 31. As shown in FIG. 6, the tile 10 is deleted from the code stream 31, resulting in the code stream 37.

Specifically, the deletion unit 41 reads the tile numbers of the tiles 36 in the code stream 31 input to the editor 23, deletes the tile 10 from the code stream 31 as specified, and outputs the remaining coded data as the code stream 37. Because the coded data corresponding to each of the tiles 36 are independent, the tiles 36 that are not deleted are unchanged, that is, the undeleted tiles 36 are the same in the code stream 31 and in the code steam 37. Therefore, to generate the code stream 37, the coded data in the code stream 31 can be used directly. It is not necessary to encode any new data; consequently, high speed image processing is enabled.

In FIG. 6, it is shown that after deletion of the tile 10 from the code stream 31, the tile 10 is not allocated in the new code stream 37. As an alternative, the tile 10 may also be allocated in the code stream 37, in which case the index of the tile 10, serving as the position data of the tile 10, is modified to a value not used by the system, so as to set the tile 10 out of the region of the input image. In doing so, the deleted tile will not be displayed even when it is decoded. Furthermore, by allocating the deleted tiles in the new code stream 37, it is possible to recover the original code stream 31 from the code stream 37.

[Extraction of Tiles]

Figure 7:
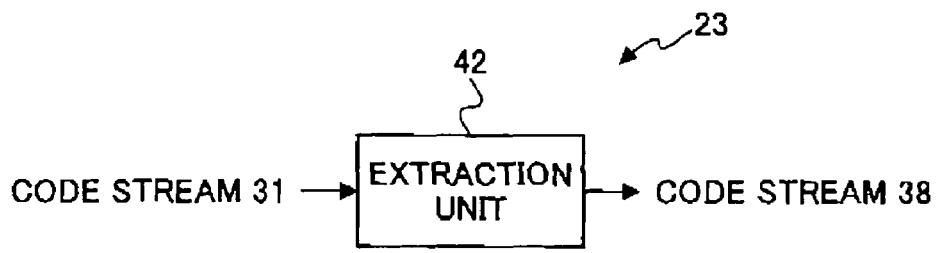
FIG. 7 is a schematic diagram showing operation of extracting tiles from a code stream.

FIG. 7 is a diagram showing an operation of extracting tiles from a code stream. As shown in FIG. 7, the editor 23 has an extraction unit 42. The extraction unit 42 extracts one or more tiles 36 from the code stream 31, and the extracted coded data form a new code stream 38.

Figure 8:
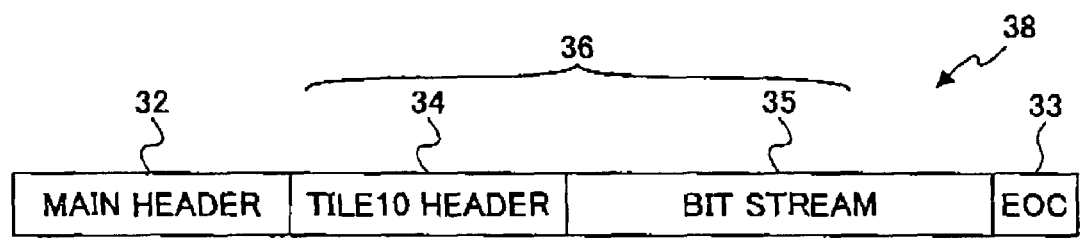
FIG. 8 is a data diagram illustrating the code stream 38 formed by tiles extracted from the code stream 31.

FIG. 8 is a diagram illustrating the code stream 38 formed by tiles extracted from the code stream 31. As shown in FIG. 8, the tile 10 is extracted from the code stream 31, and the tile 10 forms the code stream 38.

Specifically, the extraction unit 42 reads the tile numbers of the tiles 36 in the code stream 31 input to the editor 23, extracts the tile 10 from the code stream 31 as designated, and outputs the extracted coded data as the code stream 38. Because the coded data corresponding to each of the tiles 36 are independent, the extracted coded data in the code stream 38 are the same as the coded data of the tile 10 in the code stream 31. That is, to generate the code stream 38, the coded data in the code stream 31 can be used directly, and it is not necessary to encode any new data; therefore, it is possible to perform high speed image processing.

Similar to the aforesaid deletion processing, in addition to the tile 10, other unextracted tiles in the code stream 31 may also be allocated in the code stream 38, but the indices of these tiles, serving as the position data of the tiles, are modified to values not used by the system, so as to set these tiles out of the region of the input image. In doing so, these unextracted tiles will not be displayed even though they are decoded. Furthermore, by allocating the unextracted tiles in the new code stream 38, it is possible to recover the original code stream 31 from the code stream 38.

[Replacement of Tiles]

Figure 9:
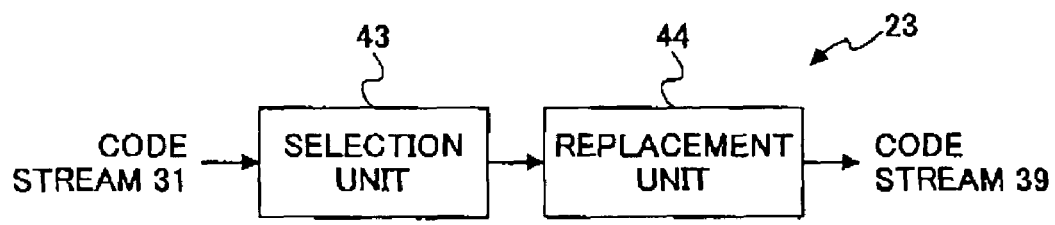
FIG. 9 is a schematic diagram showing a configuration for executing the operation of replacing tiles in a code stream with other data.

FIG. 9 is a diagram showing a configuration for executing the operation of replacing tiles in a code stream with other data. As shown in FIG. 9, the editor 23 has a selection unit 43 and a replacement unit 44. The selection unit 43 selects one or more tiles from the code stream 31, and the replacement unit 44 replaces the selected tiles with other coded data, and outputs a new code stream 39.

Figure 10:
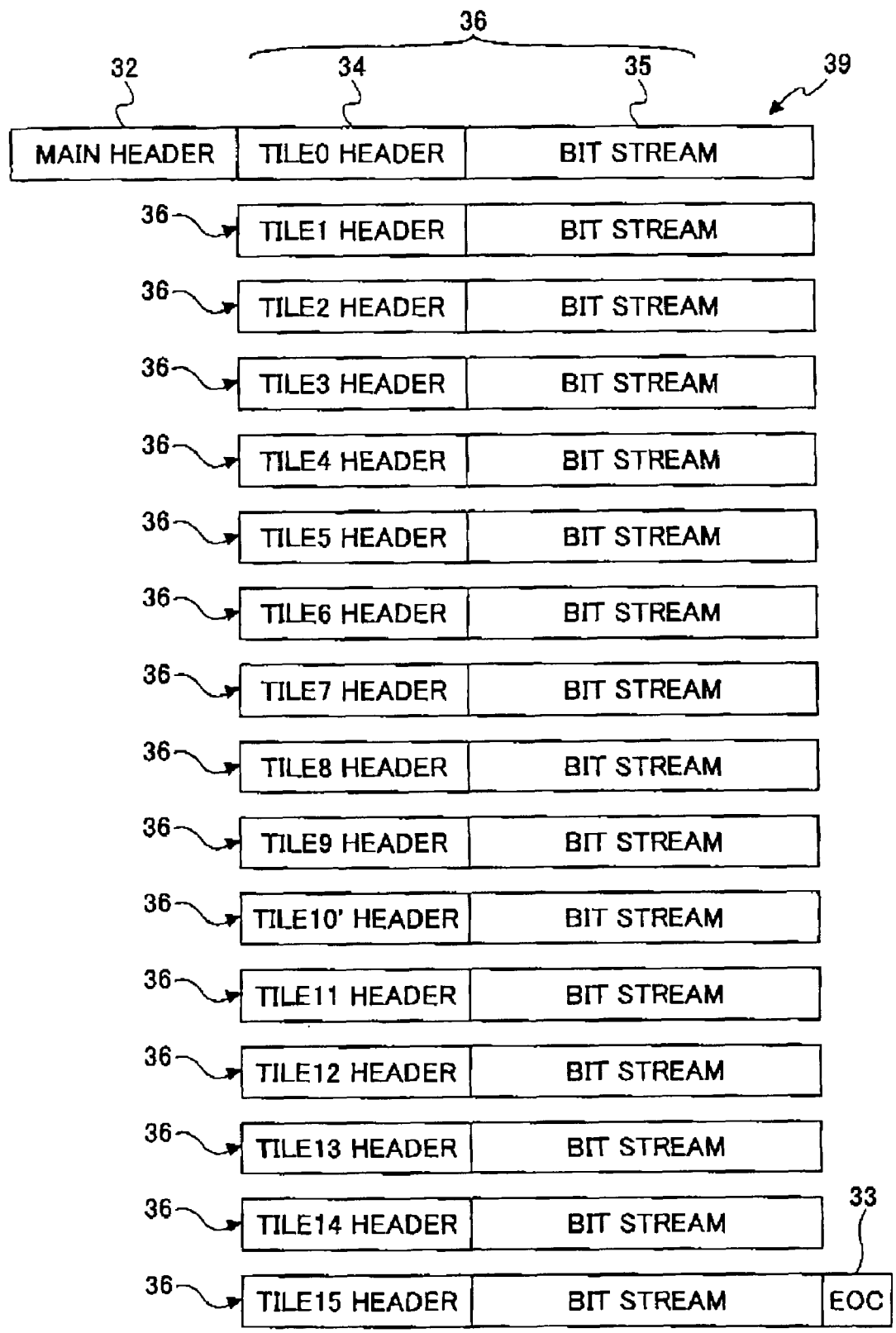
FIG. 10 is a data diagram illustrating the code stream 39 generated after replacing tiles in the code stream 31.

FIG. 10 is a diagram illustrating the code stream 39 generated after replacing tiles in the code stream 31. As shown in FIG. 10, coded data of the tile 10 in the code stream 31 is selected and replaced with coded data of a tile 10', resulting in the code stream 39.

For example, the coded data of the tile 10' may be coded data of a prepared image compressed by using the JPEG 2000 algorithm. Each pixel in the prepared image may be assigned any value, for example, data indicating white color (in the case of 8 bit pixel data, the possible value ranges from 0 through 255, and white color is equivalent to 0) may be assigned and encoded, or data indicating the texture of the original image represented by the code stream 31 may also be assigned to pixels in the prepared image.

It should be noted that when the replacement unit 44 replaces the selected tiles with other coded data, the replacement unit 44 may replace both the tile header 34 and the bit stream 35 of the selected tiles, or just replace the bit stream 35, because it is sufficient for image editing. In the latter case, however, since length of the tile header 34 or the bit stream 35 may change, length of the tile header 34 or the bit stream 35 should be rewritten.

FIG. 11 is a block diagram showing another configuration for executing the operation of replacing tiles in a code stream. As shown in FIG. 11, the editor 23 may include the selection unit 43, a decoder 45, an image data generating unit 46, a compressing unit 47, and the replacement unit 44.

The selection unit 43 selects one or more tiles from the code stream 31, the decoder 45 decodes the selected tiles, the image data generating unit 46 generates new image data based on the image data of the decoded tiles, the compressing unit 47 encodes and compresses the new image data by using the JPEG 2000 algorithm, and the replacement unit 44 replaces the selected tiles with the coded data output from the compressing unit 47, and outputs a new code stream 60.

In this configuration, the image data generating unit 46 may have various tools for processing image data, enabling a user to edit the selected tiles in any desired way.

Figure 12A:
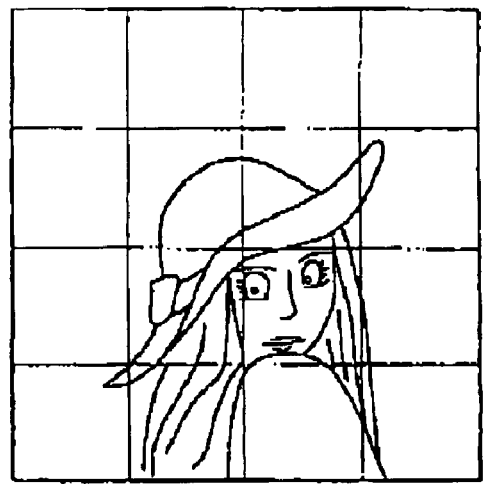
FIGS. 12A through 12C are tiled images illustrating image processing by the configuration shown in FIG. 11.
Figure 12B:
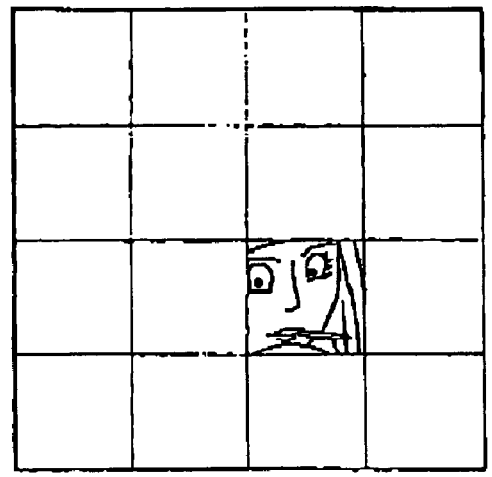
Figure 12C:
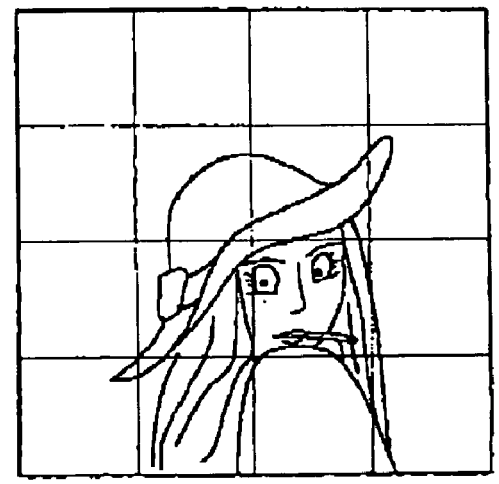

FIGS. 12A through 12C are views illustrating image processing by the configuration shown in FIG. 11. As shown in FIG. 12A, an original image is divided into 16 tiles represented by T00 through T15 in order, similar to FIG. 3. As shown in FIG. 12B, the tile 10 is selected from the original image, and the image of the tile 10 is edited by a user in the way described above, and this generates a new image, corresponding to the tile 10'.

In FIG, 12C, the tile 10 in the original image is replaced by the tile 10', forming a new image as shown in FIG. 12C corresponding to the code stream 60.

Figure 13:
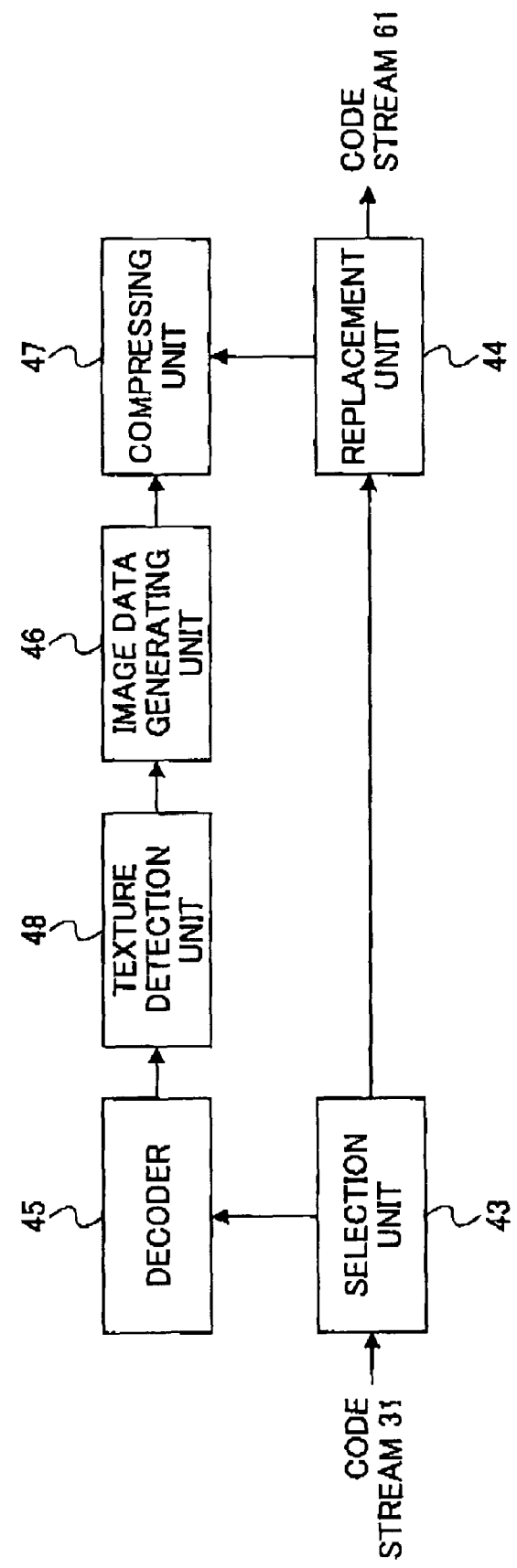
FIG. 13 is a block diagram showing still another configuration for executing the operation of replacing tiles in a code stream.

FIG. 13 is a block diagram showing still another configuration for executing the operation of replacing tiles in a code stream. As shown in FIG. 13, the editor 23 may include the selection unit 43, the decoder 45, a texture detection unit 40, the image data generating unit 46, the compressing unit 47, and the replacement unit 44.

The selection unit 43 selects one or more tiles from the code stream 31, and the decoder 45 decodes the selected tiles. The texture detection unit 48 detects pixel values of the texture portion in the image obtained by decoding the selected tiles. For example, the texture detection unit 48 counts the pixel values of the pixels in the selected image, and determines the pixel value that appears most frequently to be the pixel value of the texture portion. The image data generating unit 46 generates a new image in which the pixel values of all pixels are set to the determined texture pixel value. The compressing unit 47 encodes and compresses the new image data by using the JPEG 2000 algorithm, and the replacement unit 44 replaces the selected tiles with the coded data output from the compressing unit 47, and outputs a new code stream 61.

Second Embodiment

Figure 14:
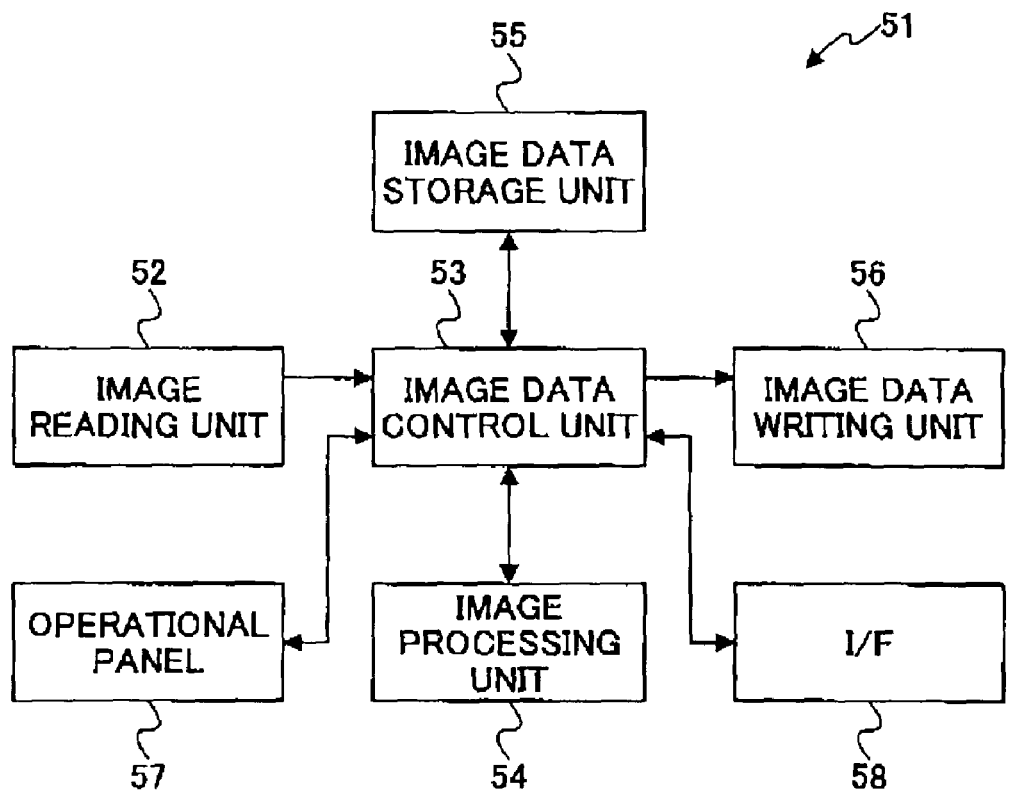
FIG. 14 is a block diagram showing a configuration of an image forming apparatus according to a second embodiment of the present invention.

FIG. 14 is a block diagram showing a configuration of an image forming apparatus according to an embodiment of the present invention.

The image forming apparatus 51 shown in FIG. 14, for example, is a digital copy machine, and includes an image reading unit 52 such as a scanner, an image data control unit 53, an image processing unit 54, an image data storage unit 55, an image data writing unit 56 equipped with a print engine, an operational panel 57, and a communication interface 58.

The image reading unit 52 irradiates light to a document and detects the light reflected by the document using a CCD (Charge Coupled Device), which converts the light to electrical signals, and digitalizes the electrical signals by an A/D converter.

The image data control unit 53 controls the other units. In addition, the image data control unit 53 has interfaces with the other units, and controls data transfer with the other units through the interfaces.

The image data storage unit 55 stores image data under instructions of the image data control unit 53.

The image data writing unit 56, controlled by the image data control unit 53, prints an image on a medium, such as a piece of paper, based on an input image. The image data writing unit 56 may print the image on the medium by means of, for example, electrophotography, inkjet, dye-sublimation heat transfer, silver salt imaging, direct thermal printing, and thermal Wax transfer.

The operational panel 57 includes a keyboard for a user to conduct operations, and a display for presenting images or messages.

The communication interface 58 is used to connect the digital copy machine 51 with computers on the outside for data transfer between them.

The image processing unit 54 is formed from any image processing device as described in the first embodiment. It performs various processing on image data transmitted from the image reading unit 52 or the communication interface 58. For example, the image processing unit 54 encodes and compresses input image data using the JPEG 2000 algorithm, and is capable of changing the image size, changing image positions, and so on.

Figure 15:
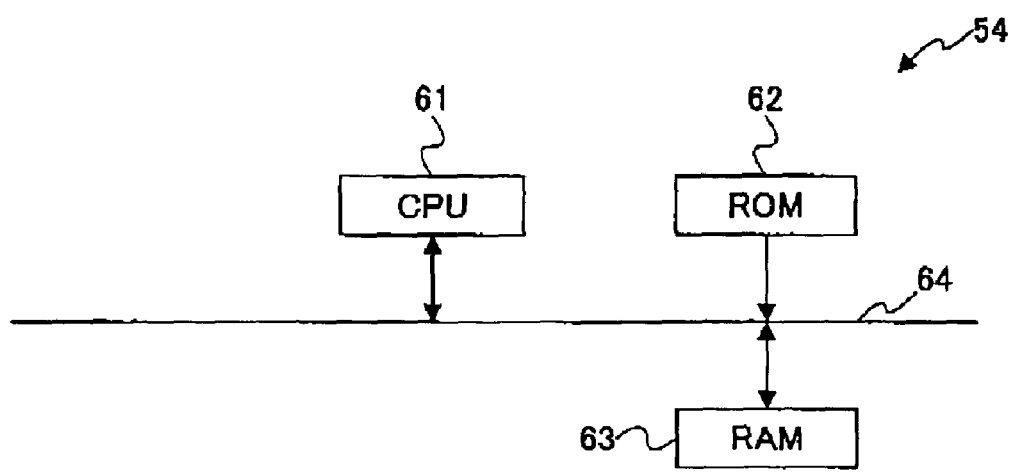
FIG. 15 is a block diagram showing a hardware configuration of a portion of the image processing unit 54.

FIG. 15 is a block diagram showing a hardware configuration of a portion of the image processing unit 54. As shown in FIG. 15, the image processing unit 54 includes a CPU 61, a ROM 62, and a RAM 63, and they are connected by the bus 64.

In the ROM 62 an image processing program is stored, and the CPU 61 executes the image processing program while using the RAM 63 as a working area thereof to realize functions as illustrated by FIG. 2, FIG. 9, FIG. 11, and FIG. 13, generates code streams as described in the first embodiment, and edits thus generated code streams in various ways.

In the editing processing, the image processing unit 54 performs various processing on image data transmitted from the image reading unit 52 and the communication interface 58. For example, the image processing unit 54 encodes and compresses input image data using the JPEG 2000 algorithm, and stores the resultant code stream in the image data storage unit 55. When necessary, the image processing unit 54 reads out the code stream from the image data storage unit 55, and edits the code stream in various ways.

FIG. 16 is a flow chart showing the operation of the digital copy machine 51 when editing a code stream of an image.

In step S1, a user operates the operation panel 57 to input a command for reading in an image.

In step S2, image data are transmitted from the image reading unit 52 or the communication interface 58.

In step S3, the image is displayed on the display on the operation panel 57.

In step S4, tiles in the image are assigned numbers, and the tiles are displayed together with the numbers. Then the user is queried whether image editing is to be performed. If image editing is to be performed, the routine proceeds to step S5. (Note: In FIG. 16 S5 change "EDITION" to "EDITING".) If image editing is not to be performed, the routine proceeds to step S13.

In step S5, if the user desires to edit the image, the user is further queried about which kind of editing is to be performed. For example, the user is requested to choose one of image partial deletion, image partial extraction, and image partial replacement.

In step S6, if the user chooses partial deletion in step S5, the user further specifies the number(s) of the tile(s) to be deleted from the image on the display.

In step S7, if the user chooses partial extraction in step S5, the user further specifies the number(s) of the tile(s) to be extracted from the image on the display.

In step S8, if the user chooses partial replacement in step S5, the user further specifies the number(s) of the tile(s) to be replaced in the image on the display.

In step S9, the user specifies paper size to be used for printing the resultant image.

In step S10, the user pushes the execution button on the operational panel 57.

In step S11, depending on the choice made in step S5, one of image partial deletion, image partial extraction, and image partial replacement is executed to edit the input image. The details of these processes are described in the first embodiment, and are omitted here.

When replacing a part of the input image, there appears a hole (an area lacking image data) in the input image. This hole can be filled, for example, by embedding an image whose pixels have the value of the texture portion of the tiles to be replaced. The pixel value of the texture portion can be determined by the texture detection unit 48 in FIG. 13.

In step S12, after processing in step S11, the resultant code stream is stored in the image data storage unit 55.

In step S13, if image editing is not to be performed, as decided in step S4, the input image data are encoded and compressed by using JPEG 2000, and a code stream is generated. This code stream is also stored in the image data storage unit 55 in step S12.

In step S14, the code stream is transmitted to the image data writing unit 56, and the corresponding image is printed on the paper of the specified size.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effects of the present invention, because the input image is divided into image sections, and these image sections are encoded independently, it is possible to independently edit any code section corresponding to an image section without decoding the code section or the whole code stream, and it is not necessary to use any special devices. As a result, it is possible to increase processing speed with a simple configuration and without increasing memory capacity.

In addition, according to the present invention, it is possible to perform editing such as deletion, extraction, and replacement of an individual image section and obtain an output code stream.

Further, it is possible to modify a part of the input image by extracting, decoding and editing an individual image section, generating a new image and putting the new image into the individual image section of the input image. For example, the pixels of the extracted image section may be modified to have other values, such as the value of the texture portion of the input image. In doing this, it is possible to naturally delete an image section or to extract an image section without leaving a hole in the input image.

Further, when the JPEG 2000 algorithm is used, according to the present invention, it is possible to edit each individual tile without being affected by wavelet division.

This patent application is based on Japanese Priority Patent Application No. 2002-273984 filed on Sep. 19, 2002, the entire contents of which are hereby incorporated by reference.

What is claimed is:

1. An image processing device, comprising:
an image dividing unit configured to divide an input image into a plurality of image sections;
an encoding unit configured to independently encode each of the image sections, and generate a first code stream including a plurality of code sections respectively corresponding to the image sections; and
an editing unit configured to edit one of the code sections in the first code stream, and to output a second code stream based on the edited code section,
wherein
the editing unit includes an index changing unit that changes an index indicating a position of one of the image sections from the first code stream and outputs the second code stream with the one of the image sections from the first image stream having the changed index.

2. The image processing device as claimed in claim 1, wherein
said editing unit comprises a deletion unit configured to delete at least one of the code sections from the first code stream and output the second code stream including the remaining code sections in the first code stream, and
the index changing unit changes an index indicating a position of the image section corresponding to the deleted code section so that the deleted code section remains in the second code stream but will not appear as a part of any reproduced image.

3. The image processing device as claimed in claim 1, wherein
said editing unit comprises an extraction unit configured to extract at least one of the code sections from the first code stream and output the second code stream including the extracted at least one code section, and
the index changing unit changes indexes indicating positions of the image sections corresponding to the un-extracted code sections so that the un-extracted code sections remain in the second code stream.

4. The image processing device as claimed in claim 1, wherein the encoding unit encodes each of the image sections by using one of entropy coding with two-dimensional discrete wavelet transformation and arithmetic coding.

5. The image processing device as claimed in claim 1, wherein the encoding unit encodes each of the image sections by using an algorithm in which a height and a width of each of the image sections are multiples of a quantity $d=2^L$, where L is a wavelet decomposition level.

6. An image processing device, comprising:
an image dividing unit configured to divide an input image into a plurality of image sections;
an encoding unit configured to independently encode each of the image sections, and generate a first code stream including a plurality of code sections respectively corresponding to the image sections; and
an editing unit configured to edit one of the code sections in the first code stream, and to output a second code stream differing from the first code string based on the edited at least one code section, wherein
said editing unit comprises:
a selection unit configured to select at least one of the code sections from the first code stream; and
a replacement unit configured to replace the selected code section with predetermined coded data, and to output the second code stream including the unselected code sections from the first code stream and the predetermined code data,
a decoding unit configured to decode the selected code section and generate first image data corresponding to the selected code section;

an image data generation unit configured to generate second image data based on the first image data;

a compression unit configured to encode the second image data and generate coded data, and to output the coded data to the replacement unit as the predetermined coded data;

a detection unit configured to determine a texture pixel value of the first image data output from the decoding unit; and the image data generation unit assigns the determined texture pixel value to pixels of the first image data and outputs the pixel-value assigned first image data as the second image data.

7. An image forming apparatus, comprising:

an image reading unit configured to read an image on a manuscript;

an image processing device, comprising: an image dividing unit configured to divide an input image into a plurality of image sections;

an encoding unit configured to independently encode each of the image sections, and generate a first code stream including a plurality of code sections respectively corresponding to the image sections; and an editing unit configured to edit one of the code sections in the first code stream, and to output a second code stream based on the edited code section, wherein the editing unit includes an index changing unit that changes an index indicating a position of one of the image sections from the first code stream and outputs the second code stream with the one of the image sections from the first image stream having the changed index, and a printer engine configured to form an image on a sheet of paper based on the second code stream.

8. A computer readable medium or memory that stores a program executable by a computer for processing an input image, the program comprising the steps of:

dividing the input image into a plurality of image sections;

independently encoding each of the image sections, and generating a first code stream including a plurality of code sections respectively corresponding to the image sections; and editing one of the code sections in the first code stream, and outputting a second code stream based on the edited code section, wherein the editing step includes an index changing step that changes an index indicating a position of one of the image sections from the first code stream and outputting the second code stream with the one of the image sections from the first image stream having the changed index.

* * * * *